Nov. 1, 1938.   J. R. MORRISON   2,134,832
CONVEYER
Filed Nov. 16, 1936   3 Sheets-Sheet 1
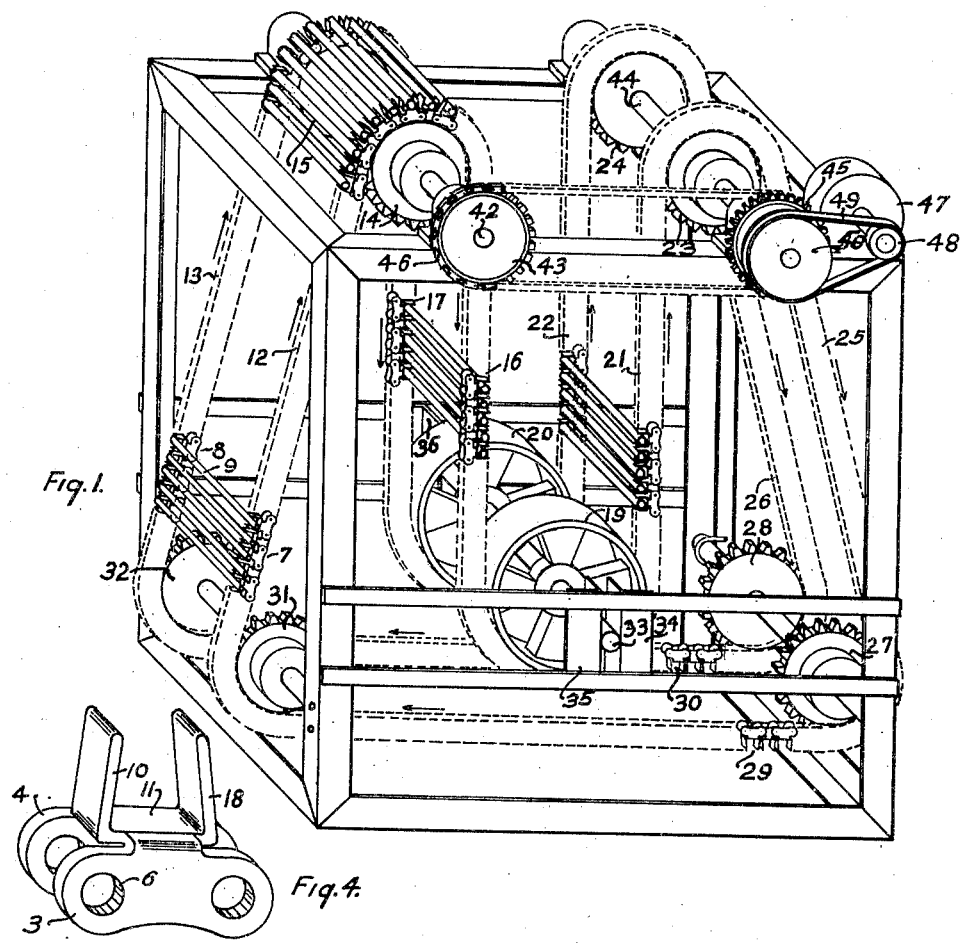
INVENTOR.
John R. Morrison.
BY
Louis J. McBane
ATTORNEY.

Nov. 1, 1938.　　J. R. MORRISON　　2,134,832
CONVEYER
Filed Nov. 16, 1936　　3 Sheets-Sheet 2

INVENTOR.
John R. Morrison
BY Louis J. McBane
ATTORNEY.

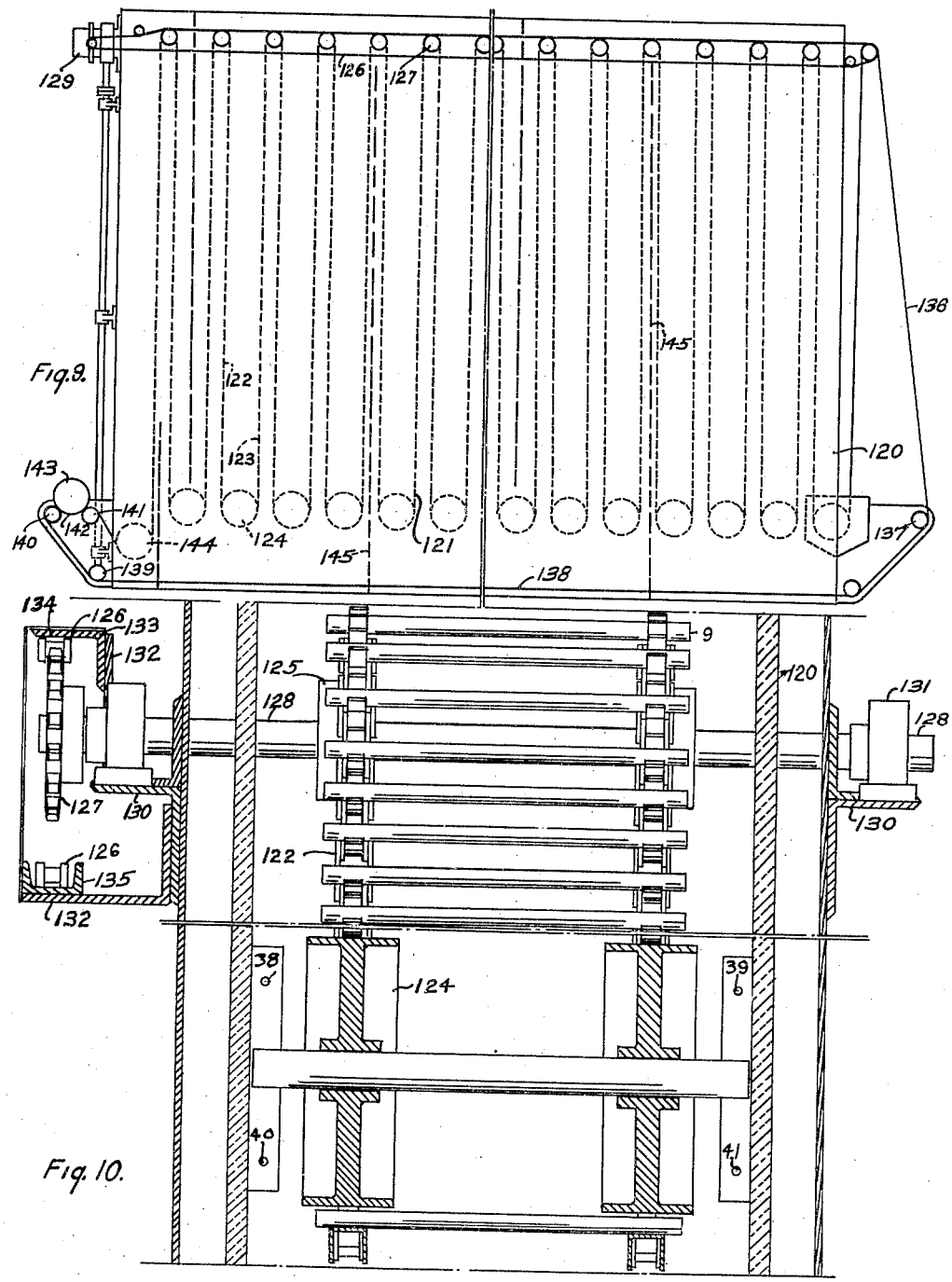

Patented Nov. 1, 1938

2,134,832

UNITED STATES PATENT OFFICE 2,134,832

CONVEYER

John R. Morrison, Hudson, Ohio

Application November 16, 1936, Serial No. 111,047

31 Claims. (Cl. 198—131)

This invention relates to a novel chain adapted for use as a conveyer. This invention also relates to a novel structure adapted to be combined with the chain for effecting the conveying function of the chain.

There are many industrial techniques which involve some treatment, such as heat treatment or immersion in fluid, for example, applied to articles of manufacture made in quantity and in a continuous production process. It is common to effect such treatments continuously, that is, to supply the articles to be treated in continuous succession to the treating equipment, to move the articles being treated in continuous succession through the treating equipment, and to discharge the treated articles in continuous succession. Where the volume of production is large and also where the time involved in the technique of treatment is large, such industrial processes, in the past, commonly have required a large area in the manufacturing plant and have involved the use of large and cumbersome equipment for maintaining the steady succession of supply of articles to be treated to, through, and from the treating equipment.

It is an object of this invention to provide a novel structure for receiving articles of manufacture, subsequently to be treated, with great facility. It is also an object of this invention to provide a novel structure for conveying such articles of manufacture in continuous succession through a region where the articles are subjected to treatment, attended by a substantially complete use of the available space in the treating region, attended by a minimum use of floor area, and attended by a maximum accessibility to the article of heat supply or of fluid contact, or the like.

It is an object of this invention to provide a structure for conveying articles through a treatment region and for discharging such articles with a maximum of facility.

Where industrial treatment technique is concerned only with heat transfer to the article of manufacture or of fluid contact with the article, or the like, an exact spatial relation of the article to the treating medium is not of vital consequence. Therefore, efficiency of production is improved upon by so disposing the articles as to make maximum use of the smallest space consistent with the exigencies of effecting the treatment. To that end, where the continuously successive movement of articles through the treatment region is maintained, it is desirable to arrange the path of movement of the articles so as to follow a large number of parallel flights thus affording a long path of movement in a comparatively small space. This practise also makes it possible to keep the articles being treated in the treatment region for a considerable period of time while maintaining a relatively high rate of movement of the articles to, through, and from the treatment region.

It is an object of this invention to provide a novel form of conveyer structure which operates to carry articles in continuous succession through a series of flights. It is an object of this invention to provide a novel conveyer structure adapted freely to receive and loosely to hold articles subject to treatment while conveying the articles through a series of flights of travel. It is also an object of this invention to provide a novel conveyer mechanism operating to convey articles in continuous succession through a series of reverse flights and operating to discharge the articles by a change in direction of travel of the moving conveyer elements.

It is an object of this invention to provide chain conveyer structure which affords chain elements adapted freely to receive and loosely to hold and to carry an article of manufacture through any number of series of reverse flights of travel and which is self-discharging.

It is an object of this invention to provide a novel chain conveyer structure operable to receive an article to be conveyed by placement, operable to carry the articles through a series of vertical reverse flights while loosely supporting the articles being conveyed and operable to discharge the articles upon a predetermined change in the direction of travel of the chain structure.

Other objects and advantages of the present invention will appear in the following detailed description taken in connection with the accompanying drawings in which:

Figure 1 is a view, in oblique perspective, of a device embodying this invention.

Figure 2 is a view, in side elevation, of a detail of the device of Figure 1, illustrating the operation of the chain.

Figures 3 and 4 are oblique perspective views of the two chain elements of which the chain of Figures 1 and 2, is constructed.

Figure 9 is a diagrammatic view of an application of the invention.

Figure 10 is a view, partly in elevation and partly in section, illustrating the drive mechanism for the conveyer system of Figure 9.

Figure 5:
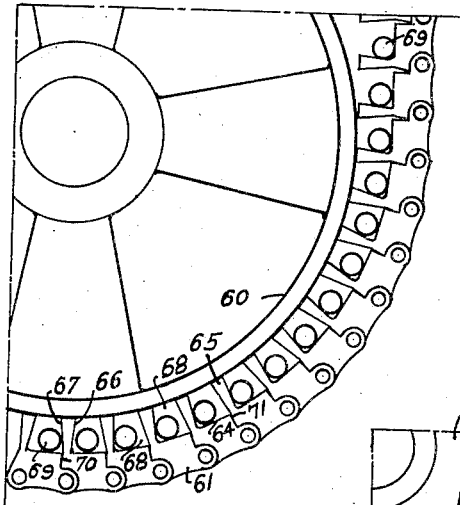
Figure 5 is a side view of a part of a conveyer system illustrating a modified chain structure.

The particular forms of the invention shown in the drawings by way of illustration, are applicable for conveying welding rods or electrodes, during the course of their manufacture, through an oven where the coating, extruded onto the core of the rod, is baked. Pursuant to the objective of moving the welding rods through a baking oven by as long a path as possible, a chain is provided as an effective structure to that end. A chain affords the requisite flexibility for following a sinuous path, best adapted to dispose the successively advancing welding rods in a series of successive flights so arranged and so spaced as to make maximum use of the space available within the baking oven.

The chain elements are equipped with structure for supporting the rods during their movement through the oven. Broadly, the supporting structure afforded by the chain elements is such as to permit placement and discharge of the articles carried with maximum facility and by operations so simple as inherently to be free from liability of failure, and to require little or no force in the performance of those functions.

For the particular use of the invention disclosed by way of illustration, the chain elements, illustrated in Figures 3 and 4, consist of side portions 1 and 2, or side portions 3 and 4, spaced apart and extending in parallel relation. The side portions are provided with apertures 5 and 6 to accommodate the pivot pins conventional to link chains. The chain element of Figure 3 is like that of Figure 4, except that the spacing of side portions 1 and 2 is different from that of side portions 3 and 4, it being intended that the side portions 1 and 2 shall extend between side portions 3 and 4 when the chain elements are assembled, the pivot pin connecting the chain elements at the registering apertures 5 and 6. This is common chain practice.

A series of the chain elements is indicated at 7 in Figure 1, there being a parallel chain and a parallel series of chain elements indicated at 8. Two parallel chains are provided to support the welding rod 9 at its two ends. The locations 7 and 8 may be regarded as the loading station. The direction of travel of the chains is indicated by the arrows. As viewed in Figure 1, the chains are moving upwardly in a plane which is inclined but slightly from the vertical. The inclination of the plane of travel at the loading station may be varied; it may be vertical or horizontal or at any inclination between those limits, with a certain limitation as to the orientation of the rod supporting structure, relative to the vertical direction, which will become clear in the subsequent description.

In order to receive the welding rod at the location 7—8, all, or at least a portion, of the chain elements are provided with projections 10. The projections 10 extend in a plane which is approximately perpendicular to the direction of travel of the chain, or perpendicular to a line joining the centers of apertures 5 or apertures 6 of the respective links. A base 11, which extends in a plane parallel to the plane of the pivot centers, is a part of the supporting structure and is arranged in such proximity to projection 10 as to afford support for the welding rod at the same time the rod is supported by projection 10. The base 11 and projection 10 are shown as integral, and also as integral with the link structure of the chain element, but such integral features of the illustrated construction are not essential to the invention. In loading the conveyer, the rods are simply laid on the projections 10. (The rod may be placed on either of the two projections of a chain element, see drawing, or upon base 11, depending on the orientation of the chain element during loading.) When a rod is laid upon projections 10, it is supported at the juncture between the projections 10 and the bases 11 of the matched chain elements of the parallel chains 12 and 13. The chains 12 and 13 steadily continue their travel upwardly from the loading position 7—8 and travel over sprockets 14 and 15, respectively. Sprockets 14 and 15 are provided to change the direction of travel of the chains and thereby to begin one or more flights of travel of the chain through an oven chamber. The flights 16 and 17, through which the chains 12 and 13 travel after passing over sprockets 14 and 15, are substantially vertical. As the chain elements pass over the sprockets 14 and 15, the projections 10 cease to support the rods, and the rods roll along the bases 11 in a direction away from projections 10. To afford support for the rods 9 when travelling downwardly in a substantially vertical flight, projections 18 are provided on the chain elements. The projections 18 also extend in a plane which is approximately perpendicular relative to the direction of travel of the chain, or to a line joining centers of apertures 5 or apertures 6 of the respective chain element. During the downward travel of the chain elements in flights 16 and 17, the rods 9 are supported at the juncture between the projections 18 and the bases 11 of the matched elements of the parallel chains 12 and 13. It will be noted that the projections 10 and 18 incline from planes, perpendicular to the direction of chain travel, slightly in directions which, when the chain elements are in vertical flights, are such that the surfaces engaged by a rod 9 incline upwardly. This arrangement of the projections prevents the rods 9 from rolling off the projections during movement through vertical flights.

The problem of supporting the rods 9 in vertical flights of travel, both up and down, does not impose any limitation upon the spacing between the projections 10 and 18 of a chain element. In order to provide maximum facility, both in loading and in unloading the rods, the projections 10 and 18 are spaced sufficiently far apart, and the trough between those elements is free from any obstruction, so that the rods may be loaded, in position to be conveyed on the several chain elements, simply by placement. The mechanism for placing the rods 9 onto the supporting structure afforded by the chain elements, may be any suitable to the purpose, and that function may be performed by hand, if desired. The freedom of movement of the rods 9, in the supporting structure afforded by the matched chain elements, also has an important advantage in that the structure is self-unloading. Discharge of the rods 9 from the chain conveyer will be described later.

The chains 12 and 13, after passing through the flights 16 and 17, travel around the pulleys 19 and 20, respectively. The pulleys 19 and 20 serve to reverse the direction of travel of the chains 12 and 13 and, after leaving the pulleys 19 and 20, the chains move through flights 21 and 22 which are substantially vertical. The flights 16—17 and 21—22 are substantially vertical and therefore substantially parallel, in order that the two flights may be spaced as closely together as possible, thereby achieving a maximum economy in the use of the space within the oven chamber. The chains 12 and 13 then pass over the sprockets 23 and 24, similar in all respects to the sprockets 14 and 15 and the chains proceed downwardly in flights 25 and 26. The flights 25 and 26 may, if desired, also be substantially vertical and substantially parallel to the flights 16—17 and 21—22. Obviously, the flights 16—17 and 21—22 may be repeated as often as desired, such flights being separated by structure like pulleys 19—20. The chains 12 and 13 may pass through a succession of substantially vertical parallel flights which are limited in number only by practical exigencies involved in the requirements as to power and the strength of materials involved. Figure 1 is intended merely to illustrate the invention and not to represent it in an actual instance of use. Accordingly but one pair of reverse flights 16—17 and 21—22 is shown. The flights 25 and 26 are intended to be illustrative of the end or discharge flights of the conveyer system. The flights 25 and 26 extend at an inclination to the vertical, and, for that matter, those flights may be horizontally arranged or arranged at any angle between horizontal and vertical. After passing through the end flights 25 and 26, the chains pass around the sprockets 27 and 28. It will be observed that, in the previous description of the chain travel, the chain elements always were so orientated as to present the mouth of the trough-like space, between the projections 10 and 18 of the chain elements, in various positions between the horizontal and the vertical with the mouth always directed laterally, or upwardly, or at some direction intermediate to those extremes, but never directed downwardly. It will be observed that, when the chains 12 and 13 pass from flights 25 and 26 around the sprockets 27 and 28, the chain elements so move as to turn the mouth of the trough-like space, between projections 10 and 18, from a laterally and upwardly inclined direction to a vertically downward direction. As the chain elements so move, the rods 9 roll freely out of the space between the projections 10 and 18, and thereby are discharged from the conveyer. The rods 9 may be received and further handled by any suitable structure or by hand if desired. Thus, discharge of the rods is effected as a self-unloading function, inherent in the rod-carrying structure afforded by the chain elements, merely by a predetermined change in the path of travel of the chain elements. No additional mechanism is required to unload the rods, and this function of the chain structure is performed in a way so simple and facile as to be entirely free from liability of failure. The chains 12 and 13 then travel through the horizontal flights 29 and 30 and around sprockets 31 and 32 and back to the loading position 7—8. Thus, the conveyer operates continuously to receive, convey and discharge the welding rods.

Since the conveyer must describe a sinuous path of movement in a generally forward direction, obviously it is necessary to dispose the moving element of the conveyer in arcs of travel about centers first on one side and next on the other side of the moving element. The moving element described has chain link structure, on one side, and object supporting structure on the other side, both disposed in the plane of flexibility of the chain. Thus, at every other turn, in the sinuous path of the conveyer, it is necessary to provide an arc of travel in which the article supporting structure is disposed on the inside of the arc. This presents the problem of maintaining the chain in a predetermined arc at such turns. While that structure may vary, other modifications being described subsequently, Figure 2 illustrates one practicable form of such structure.

In passing from flights 16—17 to flights 21—22, the chains 12 and 13, must travel around the pulleys 19 and 20, with the structure for supporting the welding rods in contact with the pulley surfaces. Since that structure inherently is not adapted to engage with sprockets, and also because of the presence of the welding rods during such travel of the chain elements, smooth surface pulleys are provided. The ends of the projections 10 and 18 engage with the pulley surface. If only part of the chain elements were provided with structure for supporting the welding rods, every other link for example, the travel of the chain about the pulleys 19 and 20 would impose no limitation upon the relation between the structure and arrangement of the projections 10 and 18. However, it is highly desirable to make the utmost possible use of the chains so as to convey a maximum number of welding rods. Therefore, each of the chain elements is equipped with structure for receiving, supporting and discharging the rods 9. The proximity of such rod-supporting structure of adjacent links, and the curvature of the path through which the elements pass in travelling about the pulleys 19 and 20, make it necessary to dispose the projections 10 and 18 so that binding of the chain will not occur. To that end, the projections 10 and 18 are inclined, relative to a plane, which plane is perpendicular to a line joining centers of the apertures 5 or the apertures 6. That inclination of projections 10 and 18 is such that the projections approach one another, in the direction away from the link structure proper. This is shown in Figures 3 and 4. As shown in Figures 3 and 4, the projections 10 and 18 are inclined in like degree. This arrangement of the projections 10 and 18 makes for smooth action as the chain travels about pulleys, such as indicated at 19 and 20. Where the invention is to be applied to uses other than for conveying welding rods, it may be desirable to incline the projections 10 and 18, of every chain element, each at an angle different from that of the other. Broadly, it is essential only so to dispose the projections 10 and 18 that a projection 18 will abut the juxtaposed surface of the adjacent projection 10, of the adjacent chain element, without binding as the chain passes around an arc, with the article supporting structure on the inside of the arc. Obviously, in so far as the problem of effecting the travel of the chain about the pulley without binding is concerned, the projections 10 and 18 may be arranged at various angles and may be of various shapes, with the single condition that projections which are juxtaposed by chain curvature at the inside of the arc, abut with one another at the juxtaposed surfaces and do not bind.

An enlarged view of the arrangement of the chain elements when traversing a pulley, is shown in Figure 2. As shown there, the ends of the projections 10 and 18 bear against the surface of the pulley. It will be observed juxtaposed pairs 10—18, of projections, are at such an inclination that the outside surfaces of those projections fit together nicely and abut to accommodate the curvature of the arc without binding. By so constructing and arranging the projections 10 and 18, the chain elements may be made of a minimum length and therefore a maximum number of chain elements may be provided in the chain, thereby affording a maximum chain capacity, with the result that the rod-supporting structures of the chain elements are packed as closely together as possible, at those arcs of travel where the ends of the projections 10 and 18 ride on the pulley surfaces. It will be observed here that three factors enter into the problem of the chain design for maximum capacity and maximum efficiency of use of the oven space, or other treatment region. The first factor is that the projections 10 and 18 be spaced sufficiently far apart to receive and discharge the welding rod, or other object, freely. A second factor is that the length of the chain element, at one extreme, be a minimum and yet be adequate to accommodate the supporting structure for the object being carried. The third factor is the radius of curvature of the arc through which the chain must pass, with the object supporting structure on the inside of the arc, and without binding. It will be observed that the arrangement of the projections 10 and 18, and the relative inclination between them, determines a minimum radius of curvature through which the chain can pass without binding. Thus, by varying the length of the chain element and by varying the angle of inclination of projections 10 and 18, the minimum radius of curvature through which the chain may pass without binding may be varied. Thus, variation in length of chain elements determines the total number of elements in a given length of chain, and therefore the capacity of the chain, while the variation in the minimum radius of curvature through which the chain may pass varies the spacing of the vertical flights through which the chain passes. Thus, the spacing of the vertical flights of the chain is associated with the total number of chain elements available in a given length of chain and, depending upon the circumstances of particular installation, these factors may be varied relative to one another so as to obtain such conveyer capacity and such utilization of space in the baking oven as would be most economical in that particular installation.

Since the chain structure inherently is such as to afford a predetermined minimum curvature in a path of travel through an arc where the projections 10 and 18 are on the inside of the path of the arc, it is possible to advance the chain through such an arc of travel and to depend upon the characteristics inherent in the chain to determine the curvature of the path which it follows. Thus, the pulleys 19 and 20 perform no function other than to keep the chains taut during travel therearound and to prevent swaying of the chains. The pulleys serve merely as guides. Therefore, the pulleys 19 and 20 are mounted upon the shaft 33 which is free to rotate, at each end between plates 34—35 and plates 36—37. While conventional bearing structure may be provided for shaft 33, it is convenient to allow the shaft 33 to be free to move up and down in the slots between the plates 34—35 and the plates 36—37 to a limited extent. The weight of the pulleys 19 and 20 is adequate to maintain the chains 12 and 13 taut and the lateral support afforded by the plates 34—35 and 36—37 prevents swaying of the chains 12 and 13, in flights 16—17 and 21—22. A suitable means such as pins 38 and 39 extend across the slots between the plates 34—35 and 36—37, respectively, to limit the upward movement of the shaft 33 so that the shaft 33 cannot be completely drawn out from between the guiding plates 34—35 and 36—37. Likewise, suitable structure such as pins 40—41 may be provided beneath the ends of the shaft 33 to prevent the shaft and pulleys 19 and 20 from falling out of the slots in which it rides, in case of chain failure. Obviously, other structure which will serve merely to guide the chains 12 and 13 in passing through the arc of travel, where the projections 10 and 18 are on the inside of the arc, may be provided. For example, suitable guides may be arranged at the outside of the chains 12 and 13 so as to prevent side sway of the flights 16—17 and 21—22, and reliance may be placed upon the characteristics inherent in the chain structure to determine the arc of curvature through which the chain passes.

It will be observed that the inclination of the projections 10 and 18 toward one another satisfies two independent requirements. The inclination of the projections provides for the curvature in certain arcs of chain travel and it also prevents the rods from rolling off either projection during chain travel through vertical flights. The invention has been described with reference to vertical parallel flights of chain travel as a desideratum which affords close "packing" of the succesive flights and efficient use of space. It will be observed that the invention is not confined to vertical parallel flights of chain travel as the ultimate limit of closeness of "packing" of the rods being conveyed. By inclining the projections 10 and 18 toward one another, in greater degree than shown in the drawings, and by extending the arc of travel about pulleys 19 and 20 to an angle greater than 180°, it is possible to arrange reverse flights of travel of the chain which permit closer approach than parallel vertical flights. In such case, the rod-supporting structure of the chain elements may be orientated, in both up and down flights, with the mouth between the ends of the projections slightly inclined in downward direction. With the rod-supporting structure so orientated, the increased inclination of the projections 10 and 18, toward one another, may be relied on to prevent the rods from rolling off either projection.

There is an advantage in so mounting the pulleys 19 and 20 that they are free to rise and fall slightly. Where the conveyer chains 12 and 13 pass into, through and out of a heated oven, a considerable change in length of the chain may occur due to expansion and contraction of the chain with the variation of the chain temperature. Such change in chain dimensions is taken up by a floating pulley system 19 and 20.

While the chain elements which make up the conveyer chain may be utilized as the medium for receiving and transmitting the power for driving the chain conveyer, if desired, it has been found convenient and more desirable to provide a separate power drive. Accordingly, the shaft 42, upon which sprockets 14 and 15 are mounted, is provided with a sprocket 43; and the shaft 44, upon which sprockets 23 and 24 are mounted, is provided with a sprocket 45. Sprockets 43 and 45 mesh with a chain 46. Any suitable source of power may be provided for driving the chain 46 and the shafts 42 and 44. For example, a motor 47 may be mounted upon the frame and provided with pulley 48 which engages with a belt 49. Belt 49 is trained over pulley 50 mounted on shaft 44. The chain 46 connects sprockets 43 and 45, so that the conveyer chains 12 and 13 will remain in synchronism at all times during their travel, irrespective of variation in speed. This insures that the matching chain elements of the chains 12 and 13 will remain in paired relation at all times so that when a rod or other object is placed thereon, no change in relation between the supporting structure of the paired chain elements will occur such as would interfere with the proper support and discharge of the rod.

In describing the form of the invention shown in Figures 1 to 4, reference has been made to baking welding rods. No oven structure is shown there, such structure being conventional. Obviously, in actual practise, the conveyer structure would be such as to provide a large number of reverse flights of the conveyer chain arranged in succession through a baking oven. It will be observed also that the invention, and, in particular, the form illustrated, is adapted for passing articles into liquid mediums for treatment. For example, it is convenient and practicable to arrange the conveyer system so that reverse flights, such as those indicated at 16—17 and 21—22, extend into a bath of liquid. Structure such as pulleys 19—20 may be immersed in the liquid bath. Obviously, a series of passes, or reverse flights, may be extended into a single bath. Or, the structure may be adapted for passing objects through a series of independent liquid baths, or combination of treating baths and heat treating chambers, by a single conveyer system of this invention. For example, each of a succession of treating baths may contain reverse flights of travel of the conveyer system, such as indicated at 16—17 and 21—22, the chain conveyer passing from flight to flight and from bath to bath in succession. Likewise, the conveyer system may be arranged to pass the objects to be treated through a bath in which flights, such as indicated at 16—17 and 21—22, are arranged, and then the objects may be conveyed through other successive reverse flights, which are arranged in a suitable oven or other treatment chamber.

The particular form of invention described in connection with Figures 1 to 4, makes use of a pair of parallel synchronously driven chains. Obviously, the invention may be modified by providing an even larger number of chains running in parallel and synchronously driven or a single chain may be used. This arrangement and disposition of the chains and the structure for carrying the object is determined largely by the structural characteristics of the object to be conveyed. For example, rods may be carried by a single chain conveyer and the projections 10 and 18 may be widened considerably as compared to the width shown in the drawings so as to support the rods without danger of them tilting and slipping out endwise during the course of travel.

The chain structure described before is a commercial form of the invention. Variations in the chain structure may be made within the purview of this invention and certain of such variations are described next, to illustrate a few variations, others being contemplated within the skill of one versed in the art.

Figure 6:
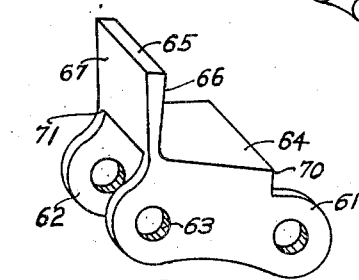
Figure 6 is an oblique perspective view illustrating a chain element of the form of the invention illustrated in Figure 5.

Figure 5 shows a modified form of the conveyer chain passing about a pulley 60 at the bottom of vertical reverse flights of chain travel. A detailed view of one of the chain links is shown in Figure 6. The design of the link structure proper of the chain element may take any conventional form, it being suitable to provide the side plates 61—62, having apertures at 63 to receive conventional pivot pins. A base 64 extends between the side plates 61 and 62, and may be integral therewith although such feature of construction is not essential to the invention. A projection 65 extends from the base 64 at one end thereof in the direction of chain travel. The projection 65 is provided with faces 66 and 67 which are inclined, divergently, relative to a plane perpendicular to the direction of chain travel. When the links are arranged in chain form, the adjacent projections 65 of adjacent links define a space 68 therebetween, which is bounded by a face 66, the base 64 and a face 67. The space 68 is of troughlike shape and opens at one side between the extremities of the adjacent projections 65, and serves to receive, to support, and to discharge articles such as welding rods in the same manner as described in connection with Figures 1–4. Welding rods 69 are shown disposed in the spaces 68. It will be noted that the construction of Figures 5 and 6 differs from that of Figures 1–4, and that the projections 65 do not abut one another at any time, and that the outside face 67 of each projection 65 performs a function like that of the inside face of projection 18 of the construction Figures 1–4. The absence of abutting contact between the projections 65 places no limitation upon the minimum arc of curvature through which the chain may pass with the projections arranged on the inside of the arc. For certain practical reasons it may be desirable so to construct chain elements 60 so that the extent of tilting movement between adjacent chain elements, with the projections 65 on the inside of the arm defined by such tilting movement, be limited. To that end, the base 64 may terminate in an edge 70, adapted to abut against the base 71 of the projection 65 of the next adjacent link. This arrangement of the chain elements is illustrated in Figure 5 and the engagement of the edge 70 and base 71 determines a minimum arc of curvature for the chain, with the projections 65 arranged in the inside of the arc. This construction insures that binding of the chain cannot occur, that welding rods or other objects cannot be pinched between the projections 65 and has still another advantage later to be described.

Figure 7:
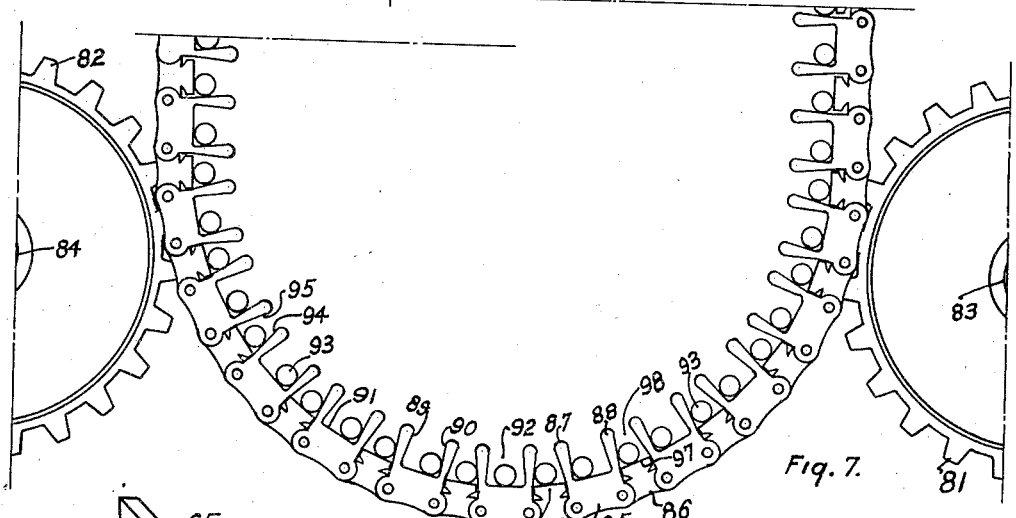
Figure 7 is a side view of a part of a conveyer system illustrating another form of chain structure and another form of mechanism useful for supporting the chain in conveyer functioning arrangement.

Still another form of the invention is illustrated in Figure 7. The structure of Figure 7 differs from that described before in two respects, namely in the structure of the chain elements, and also in the manner of guiding the chain through an arc of travel with the work supporting structure on the inside of the arc. As shown in Figure 7, instead of providing a pulley, as described hereinbefore, for guiding a chain 80 in an arc of travel with the work supporting structure on the inside of the arc, suitable sprockets 81 and 82 are provided outside of the loop formed by the chain. Sprockets 81 and 82 mesh with the chain 80, and the sprockets are keyed to shafts 83—84, respectively, which shafts are supported in suitable bearing structure not shown. The location of the sprockets 81—82 outside of the loop and at a position approximately in line or slightly below the horizontal center line of the arc of travel of chain 80, prevents swaying of the chains. The curvature of the arc of travel of the chain is determined by structural characteristics inherent in the chain. The sprockets 81—82 are spaced nicely to accommodate a minimum arc of curvature of the chain.

The chain elements are indicated at 85 and 86. Chain element 85 is provided with projections 87 and 88 which have surfaces 89 and 90 inclined slightly toward one another, relative to a plane perpendicular to the direction of travel of the chain. The surfaces 89—90, together with a base 91, define a trough-like space 92, adapted to receive, to support, to convey and to discharge objects such as welding rods 93. The projections 87 and 88 have faces 94—95, respectively, which are inclined in diverging directions relative to a plane perpendicular to the direction of chain travel. The link structure proper of the chain element 85 is conventional and the work supporting structure, last described, is combined therewith in any suitable manner. The chain elements 86 have upstanding portions 96 which afford a supporting surface 97, arranged between adjacent faces 95 and 94 of the chain elements 85 connected with the two ends of the chain element 86. The surface 97 and surfaces 95—94 define a trough-like space 98, adapted to receive, to convey and to discharge the welding rods 93 or similar objects. The manner in which the welding rods are received, conveyed and discharged by the structure illustrated in Figure 7, is similar to that mode of operation described in connection with Figures 1-4. The upstanding portion 96 engages, at the sides thereof, with the adjacent side faces 95—94, at the bottom margin thereof. This engagement limits the extent of tilting movement between adjacent chain links in a direction to form an arc with the projections on the inside of the arc. Thus, a minimum curvature, in an arc of travel of the chain, is determined. The sprockets 81 and 82 are arranged in such positions so that the chain loop formed between those sprockets is approximately of minimum curvature as determined by the construction characteristics of the chain itself.

In addition to constituting another form of guide for the chain through an arc of travel, the structural elements illustrated in Figure 7 are well adapted for disposing the chain elements in a manner convenient to loading welding rods onto the chain. By so disposing the chain elements at an arc of travel that the space within the arc is free of obstruction, suitable loading structure may be arranged in that space and operate to discharge rods into the trough-like spaces of the conveyer elements. There is an advantage in arranging the chain so that the chain elements abut one another with maximum possible approach in that no crevices between chain elements will interfere with proper loading of the rods onto the chain. This applies more particularly to the form of the invention illustrated in Figures 1 and 4, where the rods might become lodged between projections 10 and 18 of adjacent chain elements. The conveyer chain of Figures 5 and 6 may be loaded in like manner. The chain conveyer of Figure 7 is not so well adapted to such loading since the space between projections 88 and 87 of elements 85, separated by an element 86, approach closely together, at the extremities, and, depending on size and proportion of the chain structure, the gap may not be large enough to pass a welding rod.

Figure 8:
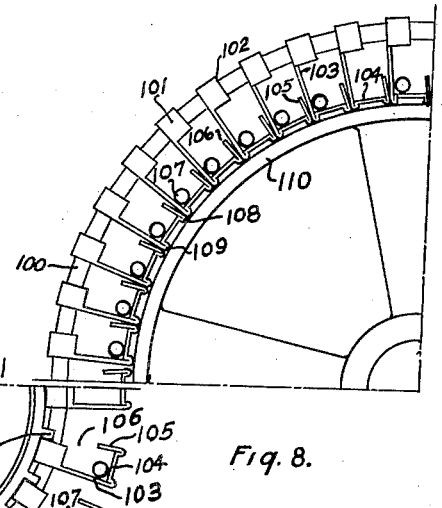
Figure 8 is a side view of still another form of the invention.

Still another modification is illustrated in Figure 8. The devices described heretofore have depended upon chain structure to provide a flexible element adapted to follow a sinuous path. Such chain structure, in so far as the link proper is concerned, can be varied widely as will be familiar to one skilled in the art. In Figure 8 a cable, which may be of wire or other suitable material, substantially inextensible under the load imposed, is substituted for a link structure which characterizes a chain. The cable is indicated at 100.

Suitable work supporting and carrying structure is indicated at 101, and consists of a clip 102, secured to the cable 100 in any suitable manner as by crimping the clip 102 tightly onto the cable 100. Each clip 102 has an extension 103 projecting therefrom in a plane substantially perpendicular to the direction of travel of the cable. Extension 103 is shaped to provide a base portion 104 which is arranged in a plane substantially parallel to the direction of travel of the cable. The extension 103 also is formed to provide end portion 105 which extends at a slight inclination to a plane perpendicular to the direction of travel of the cable. As shown, there is a gap 106 between the extremity 105 and the cable 100. The gap 106 is large enough to pass a welding rod and similar object 107 therethrough, into and out of the supporting structure. The face of end portion 105 which contacts with the welding rod 107 while carrying the latter, is inclined relative to a plane perpendicular to the direction of travel of the cable slightly toward the extension 103. Projections 108 and 109 are formed in the outside of the base portion 104.

The conveyer system of Figure 8 differs from those previously described in that, due to the arrangement of the base portion 104, relative to the cable 100, it is necessary to arrange that arc of travel, in which the object carrying structure is on the inside of the arc, at the top of reverse flights of conveyer travel. As shown in Figure 8, a smooth face pulley 110 is provided at the top of the pair of reverse flights and, in travelling about the pulley, the work carrying structure engages with the surface of the pulley 110 at projections 108 and 109, the elements 101 are spaced uniformly along the cable 100, at such distance apart, that the adjacent ends of the extensions 103 and end portions 105 abut, in proximity to the surface of the pulley 110, as the cable travels about the pulley. This determines a minimum radius of curvature and also provides good support for the conveyer structure during such travel around the pulley. In upward travel of the conveyer, the welding rods ride on end portions 105 and, in downward travel of the conveyer, the rods ride on extension 103. In making turns between flights of travel the welding rod rolls from end portion 105 across base portion 104, to extension 103, and vice-versa. The sprockets 111, provided at the lower ends of the flights of conveyer travel, have bifurcated projections 112, adapted to engage with the clips 102 and thereby drive the cable 100. The sprockets 111 are driven synchronously by any suitable means such as a chain, as described hereinbefore. The synchronous drive of all the sprockets insures that parallel cable conveyers will remain in paired relation and insures that a substantially unvarying amount of cable will always be in each flight of travel throughout the whole conveyer system.

The application of the conveyer system of this invention for baking welding rods is illustrated in Figures 9 and 10. As shown in Figure 9, an oven 120 is provided. The oven is conventional in design and construction. The conveyer is shown in outline at 121, there being a series of vertical reverse flights 122 and 123 trained over pulleys 124 at the bottom of a pair of flights and over sprockets 125 at the top of a pair of flights. In order to maintain a predetermined length of chain in any particular pair of reverse flights, it is essential that the sprockets 125 be driven in synchronism. Various drive structures may be provided for effecting a synchronous drive of sprockets 125, one practicable form consisting of a chain 126 which passes over and meshes with sprockets 127, keyed to the shafts 128, having sprockets 125 fixedly mounted thereon. By training the chain 126 over the tops of the sprockets 127 in succession, those sprockets are all driven in the same direction and at the same rate of speed, the sprockets being uniform in size. The chain 126 is driven from a suitable source of power 129.

Details of the drive structure are shown in Figure 10. The arrangement of the chain 126 so that it passes over the top of each of the sprockets 127, presents a problem of maintaining proper engagement between the chain and the sprockets. As shown in Figure 10, each shaft 128 extends across the oven chamber. Brackets 130 are mounted on the side of the oven and extend along the length thereof. Bearing structure 131 is mounted upon the brackets 130, each of the shafts 128 extending through and turning in the respective bearings 131. On one side of the oven, housing 132 is mounted upon the brackets 130. The housing 132 is arranged partially to surround the drive sprockets 127, fixed on the end of the shafts 128. An angle 133 is fixed in the housing 132 and extends along the length of the oven. Angle 133 is arranged with a face 134 in proximity to the sprockets 127 so that a chain, passing over and meshing with the sprockets 127, is supported at its back by the face 134, thus good driving engagement between the chain and the sprockets is maintained. The sprockets may be of special design, having long teeth adapted to receive the power from a chain meshing with the sprockets. The return of the chain 126 takes place along a channel 135, also supported in the housing 132 and extending throughout the length of the oven. The chain 126 slides along the channel 135. This structure provides a simple and effective means for driving the sprockets 125 of the conveyer in synchronism. It will be observed that the power is transmitted wholly by the chain throughout its length. It is necessary only to provide an adequately strong chain to transmit the power. The sprockets 127 meshed into the chain may be uniform in size, the several sprockets each receiving a similar amount of power.

After the chain conveyer has traversed the successive reverse flights of travel in the oven chamber, the last flight 136 extends downwardly and is trained about a sprocket 137. As the conveyer chain travels around the sprocket 137, the rods are discharged from the article supporting structure of the chain elements in a manner described hereinbefore. A suitable conveyer system or trucks may be provided to receive the rods discharging from the chain in the vicinity of the sprocket 137. The chain conveyor then returns to the starting point along horizontal flight 138. The drive mechanism also connects with a sprocket 139 which meshes with and drives the chain just before the latter enters the oven space. The chain is trained over sprockets 140 and 141, so spaced as to provide an arc of travel 142 therebetween, such that the projections of the work supporting structure are arranged upwardly and in juxtapostion. Such arrangement is described hereinbefore. At that point a loading device 143 is provided for discharging rods onto the conveyer chain. The conveyer chain then passes into the oven and around pulley 144 and begins the travel through the oven chamber. The structure of the heating system for the oven is of conventional design and may be that of my Patent Number 1,999,513. Partitions 145 may be arranged variously in the forepart of the oven chamber, to direct the flow of heated gases through the chamber.

Since the synchronous drive of the sprockets 125 insures that the length of conveyer chain in a particular pair of reverse flights shall remain constant, it will be obvious that the various pairs of reverse flights may be of different length, if desired, to accommodate any peculiarities in oven construction or for any other reason.

While the invention has been described in detail, by way of illustration, it is not intended so to limit the invention. Details of construction may be modified, by one skilled in the art, without departing from the scope of the invention as defined in the following claims.

What I claim as my invention is as follows:

1. A chain link constructed for pivotal connection with adjacent links, a pair of projections extending from the link, each projection being inclined from perpendicular relation to the plane of the pivot axes toward the other projection, the projections being arranged so that one follows the other through a path of travel each projection presenting a face adapted to conform to and engage with the face of the proximate projection of an adjacent pivotally connected link, such engaging faces predetermining a substantially invariable angle of tilt between the pivotally connected links.

2. A chain link having a pair of projections each extending from the link in a plane approximately perpendicular to the direction of chain travel, the proximate faces of the projections being inclined toward one another, the ends of the projections being spaced apart the distant faces of the projections being substantially flat and inclined toward one another.

3. A chain link comprising side plates joined by an integral web extending between edges of the side plates and situated centrally of the link in lengthwise direction, plate-like projections integral with the web and extending from the edges thereof situated between the side plates, said projections extending away from the link in planes slightly inclined from perpendicular relation to the direction of chain movement of the link, said projections being inclined each toward the other, the ends of the projections being spaced apart.

4. In combination, a conveying chain having a plurality of projections extending in planes approximately perpendicular to the direction of chain travel, the adjacent faces of adjacent projections being inclined toward one another relative to planes perpendicular to the direction of chain travel, means supporting the chain for movement along a path including an arc of chain travel wherein the projections are disposed on the inside of said arc, structure combined with the chain and arranged for freely separable abutting engagement during chain travel through said arc to limit the curvature of the chain.

5. In combination, a conveying chain having a plurality of projections extending in planes approximately perpendicular to the direction of chain travel, said projections being spaced apart to provide object receiving spaces therebetween, the projections and chain presenting a plurality of object engaging faces arranged to support the object resting thereon during movement of the chain in various directions between and including the horizontal and vertical directions, means supporting the chain for movement along a path including an arc of travel wherein the projections are disposed on the inside of said arc, said means including guiding structure for the chain at said arc, the structure being clear of any objects supported in said spaces and projecting laterally relative to the chain in either direction for a distance unlimited by the structure.

6. In combination, a conveying chain having a plurality of projections extending in directions approximately perpendicular to the planes of the axes of pivotal connection between chain elements, said projections being spaced apart to provide object receiving spaces therebetween, said projections and chain presenting a plurality of faces arranged about each space to support an object resting thereon, the supporting faces being arranged to permit free movement of the object from face to face and to permit discharge of the object from each said space as the chain moves in various directions of travel, means supporting the chain for movement along a path including an arc of chain travel wherein the projections are disposed on the inside of said arc, guiding means arranged to engage with the extremities of said projections at said arc.

7. In combination, a conveying chain having pivotally connected elements, object supporting structure combined with the chain and including a plurality of projections extending in directions approximately perpendicular to the planes of the axes of the pivotal connections between chain elements, said structure including bases arranged between adjacent projections, said projections and bases presenting a plurality of faces arranged to define object receiving spaces and adapted to support objects resting thereon, means supporting the chain for movement along a path including an arc of chain travel wherein the projections are disposed on the inside of said arc, guiding means in engagement with the chain at said arc and radially spaced from the arc of travel of said faces.

8. In combination, a conveying chain having pivotally connected elements, object supporting structure combined with the chain and including a plurality of projections extending in directions approximately perpendicular to the planes of the axes of the pivotal connections between chain elements, said structure including bases arranged between adjacent projections, said projections presenting adjacent faces inclined toward one another relative to planes perpendicular to the direction of chain travel, said faces and said bases defining a plurality of object receiving spaces, there being a gap between the extremities of adjacent projections, said structure being constructed and arranged to support objects at said faces and bases and to permit free movement of the objects from face to face and discharge of the objects from said spaces as the direction of movement of the chain varies, means supporting the chain for movement along a path including an arc of path travel wherein the projections are disposed on the inside of said arc, guide means rotatable about the axis of said arc and arranged to engage the extremities of the projections travelling through said arc.

9. A conveyer comprising a flexible element, object supporting structure combined with the element and arranged along one side of the element, said structure presenting a plurality of object supporting faces contiguous to one another and disposed in a plurality of planes, there being a gap in the object supporting structure, means for supporting the element in substantially vertical flights of travel with reverse turns at flight tops wherein the supporting structure is external to the turn and with reverse turns at flight bottoms wherein the supporting structure is internal to the turn, said structure being arranged to support an object resting on said surfaces and to permit free movement of the object from face to face as the element advances about said turns, element advancing means engaging with said element at top turns.

10. A conveyer system comprising a flexible element, means for supporting the element in a sinuous path of movement, object supporting structure combined with the element and projecting laterally to the path of movement from one side of the element, said structure presenting a plurality of faces arranged to define a plurality of object receiving spaces, said spaces each being open at a side, the contiguous faces of each space being arranged to support an object resting thereon and to permit free movement of the object from face to face and through the opening as the direction of travel of the flexible element varies, said means including a guide for supporting the flexible element in an arc in the path of movement where the object supporting structure is arranged on the inside of the arc, said means being clear of any objects supported in said spaces and projecting laterally relative to the chain in either direction for a distance unlimited by the means.

11. A conveyer system comprising a chain of pivotally connected elements, projections extending from one side of the chain in directions approximately perpendicular to the planes of the axes of the pivotal connections between the chain elements, said projections providing object receiving spaces therebetween, the extremities of the projections being spaced apart to permit free movement of the objects into and out of said spaces, means for supporting the chain in a sinuous path of movement where the chain forms an arc with the projections on the inside of the arc, said means being clear of any objects supported in said spaces and projecting laterally relative to the chain in either direction for a distance unlimited by the means.

12. A conveyer system comprising a chain of pivotally connected elements, projections extending from one side of the chain in directions approximately perpendicular to the planes of the axes of the pivotal connections between the chain elements, said projections providing object receiving spaces therebetween, the extremities of the projections being spaced apart to permit free movement of the objects into and out of said spaces, means for supporting the chain in a sinuous path of movement where the chain forms an arc with the projections on the inside of the arc, said means including a pulley arranged for engagement by the extremities of the projections as the projections pass through said arc.

13. A conveyer system comprising a chain of pivotally connected elements, projections extending from one side of the chain in directions approximately perpendicular to the planes of the axes of the pivotal connections between the chain elements, said projections providing object receiving spaces therebetween, the extremities of the projections being spaced apart to permit free movement of the objects into and out of said spaces, means for supporting the chain in a sinuous path of movement where the chain forms an arc with the projections on the inside of the arc, said means including sprockets arranged to mesh with the chain elements at the outside of said arc.

14. A conveyer system comprising a chain of pivotally connected elements, object supporting structure projecting from a side of the chain in a direction such as to be disposed on the inside of an arc in the path of movement of the chain, mechanism for supporting the chain in a sinuous path of movement including means engaging with the object supporting structure at the inside of said arc.

15. A chain element comprising link structure adapted for pivotal connection to like structure of an adjacent element, object supporting structure combined with the link structure and including projections which extend from the element substantially in the plane of chain flexibility, the adjacent projections of connected chain elements having faces of such configuration and so arranged as to abut at a predetermined and substantially invariable angle without binding during travel of the chain through an arc with the projections disposed on the inside of the arc.

16. A conveyer chain having chain elements, pivots joining the elements to permit flexing of the chain in a plane, object supporting structure combined with each of consecutive chain elements, said structure including a base and a pair of projections extending approximately at right angles to the base, said projections being spaced apart in the direction of chain travel and being disposed relative to the base so that each affords supporting engagement with an object engaged with the base, the extremities of the projections being spaced apart so as to pass the object freely, the adjacent projections of connected chain elements being constructed and arranged to abut without binding during travel of the chain through an arc of predetermined maximum curvature with the projections disposed on the inside of the arc.

17. A conveyer system comprising a flexible member, object supporting elements combined with the member and projecting from a side thereof in a direction lateral to the direction of travel, means for supporting the flexible member in a sinuous path of movement wherein said elements are disposed on the inside of at least one arc in the path of movement, said elements being constructed and arranged to abut one another at a predetermined and substantially invariable angle at said arc and thereby to limit the curvature of the arc.

18. A conveyer system comprising a flexible member, object supporting elements combined with the member and projecting from a side thereof in a direction lateral to the direction of travel, means for supporting the flexible member in a sinuous path of movement wherein said elements are disposed on the inside of at least one arc in the path of movement, said elements being constructed and arranged to abut one another at said arc and thereby to limit the curvature of the arc, and means for supporting and guiding the member at said arc.

19. A conveyer system comprising a flexible member, object supporting elements combined with a member and projecting from a side thereof in a direction lateral to the direction of travel, means for supporting the flexible member in a sinuous path of movement wherein said elements are disposed on the inside of at least one arc in the path of movement, said elements being constructed and arranged to abut one another at said arc and thereby to limit the curvature of the arc, and means for supporting and guiding the member at said arc, the last mentioned means including a pulley inside the arc in engagement with the object supporting elements.

20. A conveyer system comprising a flexible member, object supporting elements combined with the member and projecting from a side thereof in a direction lateral to the direction of travel, means for supporting the flexible member in a sinuous path of movement wherein said elements are disposed on the inside of at least one arc in the path of movement, said elements being constructed and arranged to abut one another at said arc and thereby to limit the curvature of the arc, and means for supporting and guiding the member at said arc, the last mentioned means including sprockets outside of the arc in engagement with the flexible element.

21. A conveyer chain having chain elements, pivots joining the elements to permit flexing of the chain in a plane, object supporting structure combined with each of a plurality of consecutive chain elements, said structure including a base and at least two projections, said projections being spaced apart in the direction of chain travel and being disposed relative to the base so that each affords supporting engagement with an object engaged with the base, the extremities of the projections being spaced apart so as to pass the object freely, said projections having inclined faces at the sides proximate to the base so disposed relative to the direction of chain travel as to support the object in substantially vertical flights of chain travel either up or down.

22. A conveyer chain having chain elements, pivots joining the elements to permit flexing of the chain in a plane, object supporting structure combined with each of a plurality of consecutive chain elements, said structure including a base and at least two projections, said projections being spaced apart in the direction of chain travel and being disposed relative to the base so that each affords supporting engagement with an object engaged with the base, the extremities of the projections being spaced apart so as to pass the object freely, said projections having inclined faces at the sides proximate to the base so disposed relative to the direction of chain travel as to support the object in substantially vertical flights of chain travel either up or down, and said projections having faces proximate to the faces of the next projection of the adjacent chain element which faces are so arranged as to abut without binding during travel of the chain through an arc of predetermined maximum curvature with the projections on the inside of the arc.

23. In combination, one or more flexible elements having object supporting structure disposed laterally along one side of each element, said structure providing recesses open to receive and to discharge objects, each element being disposed for advancing movement through a succession of substantially vertical flights of travel with reverse turns at flight tops and flight bottoms, the object supporting structure being disposed alternately on the inside and on the outside of successive reverse turns, said structure being arranged to support objects throughout movement in said flights and reverse turns, means for supporting each element at top turns and for guiding each element at bottom turns, and drive means engaging and advancing each element.

24. In combination, one or more flexible elements having object supporting structure disposed laterally along one side of each element, said structure providing recesses open to receive and to discharge objects, each element being disposed for advancing movement through a succession of substantially vertical flights of travel with reverse turns at flight tops and flight bottoms, the object supporting structure being disposed alternately on the inside and on the outside of successive reverse turns, said structure being arranged to support objects throughout movement in said flights and reverse turns, means for supporting each element at top turns and for guiding each element at bottom turns, drive means engaging each element at a plurality of reverse turns, means for operating said drive means synchronously at the several places of engagement.

25. In combination, one or more flexible elements having object supporting structure disposed laterally along one side of each element, said structure providing recesses open to receive and to discharge objects, each element being disposed for advancing movement through a succession of substantially vertical flights of travel with reverse turns at flight tops and flight bottoms, the object supporting structure being disposed alternately on the inside and on the outside of successive reverse turns, said structure being arranged to support objects throughout movement in said flights and reverse turns, means for supporting each element at top turns and for guiding each element at bottom turns, and drive means engaging and advancing each element, the path of travel of each element also including a turn where the object supporting structure is orientated so that the objects may freely discharge from the open recesses.

26. In combination, one or more chains, object supporting structure projecting from a side of each chain, each chain being disposed for advancing movement through a succession of flights of travel with reverse turns at flight ends, the object supporting structure being disposed alternately on the inside and on the outside of the chain arc at successive reverse turns, said structure being arranged to support objects throughout movement in said flights and reverse turns, means for supporting each chain, drive means engaging and advancing each chain.

27. In combination, one or more chains, object supporting structure projecting from a side of each chain, each chain being disposed for advancing movement through a succession of flights of travel with reverse turns at flight ends, the object supporting structure being disposed alternately on the inside and on the outside of the chain arc at successive reverse turns, said structure being arranged to support objects throughout movement in said flights and reverse turns, means for supporting each chain, synchronized drive means engaging each chain at a plurality of reverse turns.

28. In combination, one or more flexible elements, object supporting structure combined with each element and providing recesses open freely to receive, to bear, and to discharge objects lying therein as determined by the orientation of the open recesses, each element being arranged for advancing movement through a succession of flights of travel with reverse turns joining flight ends, said recesses passing through said flights and reverse turns with orientation such as to afford support for objects lying freely therein, means to support and to guide each flexible element in said advancing movement, means engaging with each flexible element at a plurality of locations along the path of movement, means for operating the last-mentioned means synchronously to advance each flexible element.

29. In combination, one or more flexible elements, object supporting structure combined with each element and providing recesses open freely to receive, to support, and to discharge objects lying therein, as determined by the orientation of the open recesses, supporting means for each element, each element being arranged in a plurality of reverse turns about said supporting means and depending therefrom in flights joined by lower reverse turns, guides for each element at said lower reverse turns, said recesses passing through said turns and flights with orientation such as freely to support objects lying therein, drive means for advancing each element, and means for maintaining a predetermined length of each element between the successive reverse turns about said supporting means.

30. In combination, one or more flexible elements, object supporting structure combined with each element and providing recesses open freely to receive, to support, and to discharge objects lying therein, as determined by the orientation of the open recesses, supporting means for each element, each element being arranged in a plurality of reverse turns about said supporting means and depending therefrom in flights joined by lower reverse turns, guides for each element at said lower reverse turns, said recesses passing through said turns and flights with orientation such as freely to support objects lying therein, drive means for advancing each element, and means for maintaining constant the length of each element between each successive pair of upper reverse turns about said supporting means, the length of element between any successive pair of upper turns being independent of the length of element between any other successive pair of upper turns.

31. In combination, one or more flexible elements, object supporting structure combined with each element and providing recesses open freely to receive, to support, and to discharge objects lying therein, as determined by the orientation of the open recesses, supporting means for each element, each element being arranged in a plurality of reverse turns about said supporting means and depending therefrom in flights joined by lower reverse turns, guides for each element at said lower reverse turns, said recesses passing through said turns and flights with orientation such as freely to support objects lying therein, drive means for advancing each element, said drive means engaging each element at each reverse turn about said supporting means and operating synchronously to advance each element at each engagement.

JOHN R. MORRISON.